United States Patent
Rademacher et al.

[15] 3,680,116
[45] July 25, 1972

[54] METHOD AND APPARATUS FOR SIGNAL DETECTION

[72] Inventors: Paul Rademacher, Glen Head; Burton L. Hulland, Glenwood Landing, both of N.Y.

[73] Assignee: Dynell Electronics Corporation, Melville, N.Y.

[22] Filed: May 7, 1970

[21] Appl. No.: 35,468

[52] U.S. Cl. ............................343/105, 324/83 R, 328/130
[51] Int. Cl. ...........................................................G01s 1/30
[58] Field of Search............................343/103, 105, 17.1 R; 324/83 A, 77 B; 328/130

[56] References Cited

UNITED STATES PATENTS 3,343,170   9/1967   Maine.....................................343/103

Primary Examiner—Benjamin A. Borchelt
Assistant Examiner—R. Kinberg
Attorney—Robert R. Strack and James A. Eisenman

[57] ABSTRACT

A visual display is provided by juxtaposing indications of locally generated signals with indications of corresponding received signals. The locally generated signals and the received signals are synchronized by observation of the display and adjustment of the phase of the local signals.

17 Claims, 19 Drawing Figures

INVENTOR.
BURTON HULLAND
BY
*Eisenman and Strack*
ATTORNEY

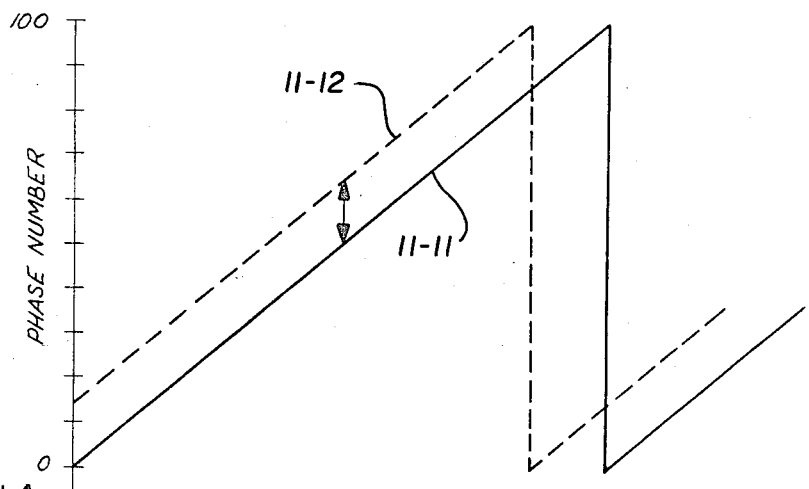
FIG. 11A
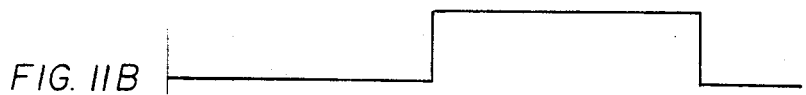
FIG. 11B
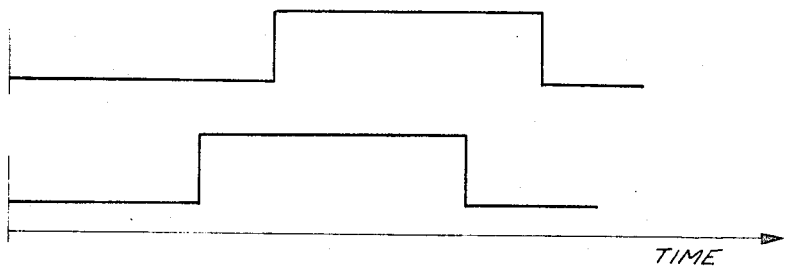
FIG. 11C
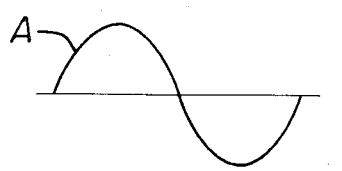 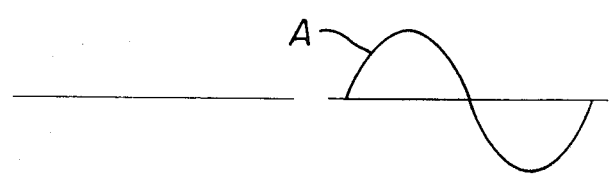
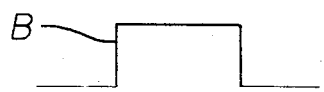 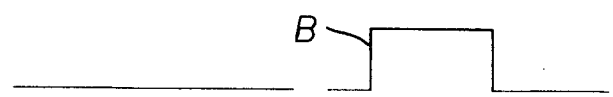
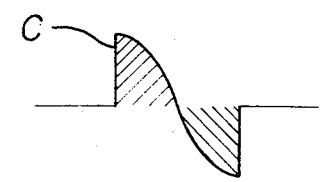 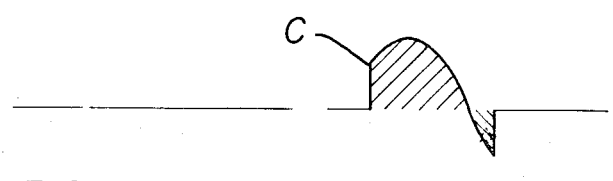
FIG. 12

METHOD AND APPARATUS FOR SIGNAL DETECTION

BACKGROUND OF THE INVENTION

The present invention relates to methods and apparatus for signal detection; more particularly, it relates to methods and apparatus for detecting sequentially transmitted signals of known, but different duration.

The Omega Navigation System is based upon the detection and relative evaluation of signals transmitted from a plurality of stations which are strategically located about the earth. Each station transmits signals of a particular duration and thus the transmitting stations can be identified by determining the duration of a received signal. In addition to utilizing discrete signal durations for each station, this system establishes a particular sequence of transmissions for all stations. The sequence insures that the stations transmit in a predetermined order within a recurring ten second period. Receiving equipment adapted to function within the Omega Navigation System must be capable of detecting the transmitted signals and should preferably identify the signals as being of a particular duration. With this information relative to two transmitted signals, one can tell where these signals occur within the transmitting sequence.

Existing receivers generate local signals corresponding to the transmitted signals in both duration and sequence of occurrence. These local signals are then used in an audible detection arrangement to synchronize the receiver with audible indications of received signals. In general, the existing detection arrangements do not offer simultaneous operation on all received signals nor do they provide a simple or satisfactory alignment procedure.

SUMMARY OF THE INVENTION

An object of the invention is to provide an improved method and apparatus for signal detection.

Another object of the invention is to provide an improved method and apparatus for signal detection based upon digital techniques.

Another object of the invention is to provide an improved method and apparatus for signal detection including a visual display.

Another object of the invention is to provide an improved method and apparatus for signal detection simultaneously operative upon a plurality of sequentially received signals.

Another object of the invention is to provide an improved method and apparatus for signal detection operative upon sequentially received signals having known duration characteristics.

Another object of the invention is to provide an improved method and apparatus for the detection of sequentially transmitted signals wherein said signals are subject to deterioration prior to reception.

Another object of the invention is to provide an improved method and apparatus for the detection of sequentially transmitted signals including digital means for reconstituting said signals at a receiving position and for adjusting the phase of locally generated signals in accordance with said reconstituted signals.

In accordance with a particular embodiment of the invention there is provided a method of signal detection responsive to sequentially transmitted signals of known, but different, duration which are transmitted with a recurring period; comprising sequentially generating a plurality of signals corresponding to each of the transmitted signals, visually displaying the generated signals and the transmitted signals in a corresponding time-related manner and with corresponding signals in juxtaposition, and adjusting the phase of the generated signals to effect coincidence of the displays of the generated and transmitted signals.

In accordance with another aspect of the invention there is provided a signal detection system responsive to sequentially received signals of known, but different, durations which are received with a recurring period; comprising means for sequentially generating a plurality of local signals having said known, but different, durations; first means for creating a visual display corresponding to the occurrence of each of the generated signals; and second means for creating a visual display corresponding to the reception of each of the received signals in juxtaposition with the display of the generated signals.

Both the method and the apparatus of this invention are specifically designed to utilize digital techniques to achieve accuracy, reliability, and simplicity.

A more complete understanding of the invention and a better appreciation of the features thereof will be available from the following detailed description of a preferred embodiment.

BRIEF DESCRIPTION OF THE DRAWINGS

FIG. 8A is a schematic illustrating the manner in which FIGS. 5–8 may be oriented in order to provide a complete detailed block diagram of a receiver embodying the features of the present invention;

FIGS. 11A, 11B, and 11C comprise a graph and waveforms useful in explaining the functioning of the Binary-Coded-Decimal Adder employed in the Receiving and Signal Detection section;

FIGS. 12A, 12B, and 12C present a number of illustrative waveforms useful in explaining the operation of the Phase Detector appearing in the Receiving and Signal Detection section;

DETAILED DESCRIPTION OF THE PREFERRED EMBODIMENT

General Discussion of the Omega Navigation System

The Omega Navigation system within which the receiver of this invention functions, is a v.l.f. system wherein each transmitter furnishes signals having a range of 5,000 to 8,000 miles. These signals make it possible to provide overlapping or redundant navigation over the entire earth with only eight transmitting stations. At present, the operating system employs four stations A, B, C, and D, located at Bratland, Norway; Trinidad, West Indies; Haika, Hawaii; and Forestport, New York, respectively. Four additional stations are contemplated.

Figure 3:
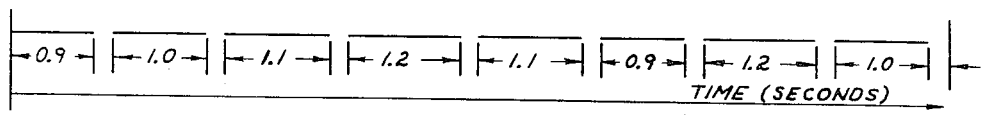
FIG. 3 is a timing diagram illustrating the duration of signals produced by four typical Omega transmitting stations.

The transmissions from each station are synchronized relative to every other station in accordance with a predetermined program. As illustrated in FIG. 3, bars representative of the transmission time from four stations, A, B, C, and D, are disposed in separate horizontal rows. The abscissa in this FIGURE represents time. Each station transmits a continuous wave at two distinct frequencies. 10.2 kilohertz transmissions (which are used for fundamental measurements) are shown as a shaded bar and 13.6 kilohertz transmissions (which are used for lane resolution) are shown as an unshaded bar. Although only four stations are specifically illustrated, it will be understood that transmissions from the remaining four stations (e.g. stations E, F, G, and H) may be similarly represented and may be considered to transmit in sequence for 1.1 seconds, 0.9 second, 1.2 seconds, and 1.0 second, respectively. THe complete cycle illustrated in FIG. 3 repeats every 10 seconds. During this interval, there are eight transmission periods of variable length, and a 0.2-second interval between each transmission period. Only one station transmits on a particular frequency during each of the periods. Thus, the transmissions from each station are unambiguous and unique. On the other hand, since two stations transmit for the same time duration, although not simultaneously, provision must be made for ascertaining at which time within a complete 10-second transmission cycle, a particular transmission appeared.

Considering the relationship of wavelengths to distance, one may note that the relative phase between two transmitters will recur along the base line at intervals of 8 miles. These intervals, called lanes, are determined by the one-half wavelength of 10.2 kilohertz. Thus, there is an ambiguity of phase and, therefore, position, which repeats every 8 miles. Unless one's position is known to within 4 miles, further means must be provided to obtain a position fix. Operations are also carried out at the 13.6 kilohertz frequency which is 4/3 times the basic 10.2 kilohertz frequency. This additional frequency provides a separate set of phase contours, differing in position along the earth. By operating on both frequencies, the effective lane separation can be increased to approximately 24 miles, which is that which would be obtained if the difference frequency of 3.4 kilohertz were utilized. The more transmitter pairs used for measurements, the more accurate one may develop position information.

Figure 2:
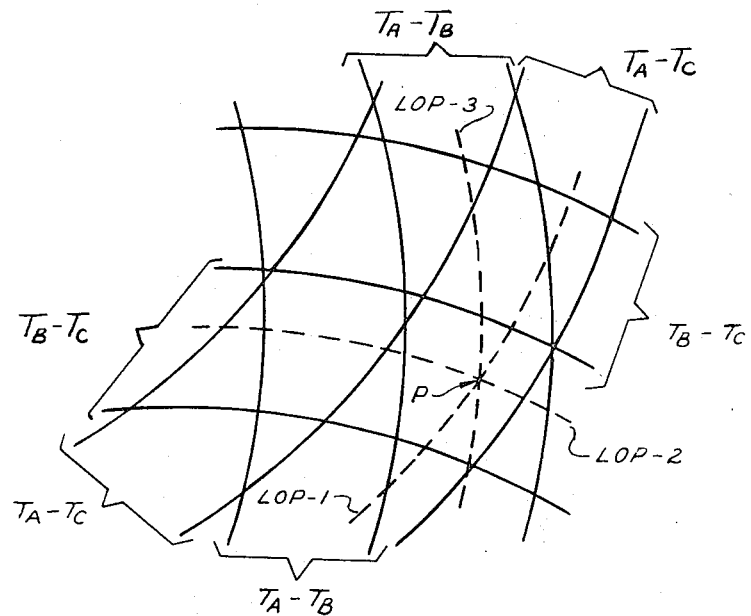
FIG. 2 is an illustrative sketch of a small portion of an Omega navigation chart useful in understanding the Omega long-range navigation system and the features thereof relevant to this invention.

FIG. 2 represents a small segment of an Omega navigation chart and illustrates a receiver position P. The chart shows several lanes defined by the signals from three transmitters A, B, and C. Lanes $T_A-T_C$ are defined by the signals from transmitters A and C; lanes $T_A-T_B$ are defined by the signals from transmitters A and B; and lanes $T_B-T_C$ are defined by the signals from transmitters B and C.

In order to obtain a position fix, one first selects a pair of transmitters, e.g., A and C, and measures the continuous in phase between the continuots 10.2 kilohertz wave signals received therefrom. This will yield a hyperbolic Line-Of-Position, LOP-1, for the observer, similar to that obtained by measuring the time delay between LORAN-C transmissions from two transmitters. The same process is then repeated for one or more additional transmitter pairs, e.g., B and C, and A and B, in order to generate additional Lines-of-Position, LOP-2, LOP-3, respectively. The receiver's position is accurately determined by the intersection of any two LOPs. Obviously, if the crossing angle at the intersection is large, the accuracy of the determination is greater. It is accordingly quite important to choose appropriate transmitter pairs in order to establish the most accurate position fix.

The position itself is established on charts which contain the hyperbolic LOPs for daytime Omega readings of all operational transmitter pairs. In addition, tables are provided containing the annual and the diurnal changes in the velocity of propagation which enable a navigator to reduce his observed readings to the equivalent daytime reading before locating his position on the chart.

Although the transmitted signals from each station are synchronized, they include neither synchronization nor phase reference information. Thus, the phase shift between each pair of transmitters must be measured relative to the phase of a local source. In order to establish the relative phase of two received signals, and utilize this information, the desired signals must be identified, separated from one another, and "locked onto" in a manner that will permit their continuous phase tracking and facilitate the subsequent measurement of phase differences.

IT is desirable and necessary to provide a receiver which is capable of receiving on at least three stations simultaneously on 10.2 kilohertz, and simultaneously receive at least three transmissions at 13.6 kilohertz. Of course, the ability to receive more than three stations greatly enhances navigation capability. The receiver discussed hereinafter is, in fact, capable of simultaneously receiving signals on both frequencies from all eight transmitters simultaneously.

General Receiver Operation

Figure 1:
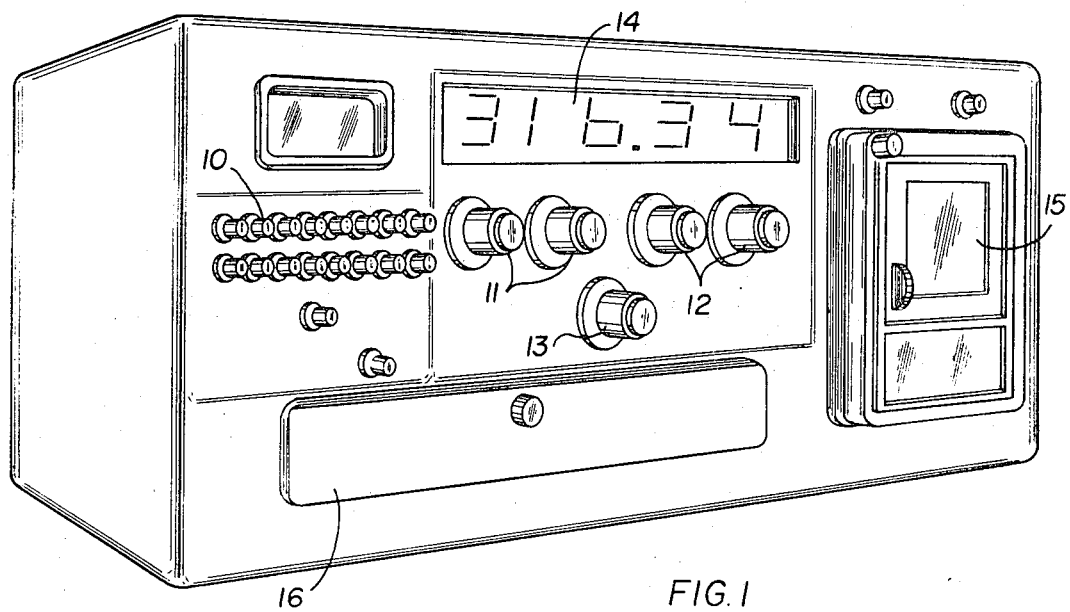
FIG. 1 is a perspective view of an Omega receiver embodying the features of the present invention.

By utilizing digital and multiplexing techniques, the compact, lightweight, and highly reliable unit shown in FIG. 1 has been developed.

On the panel of the Receiver illustrated in FIG. 1, we will find the unique signal acquisition system represented by the two rows of lights 10, positioned at the center-left. Two pairs of transmitter selector dials 11 and 12 enable the operator to select the particular transmitter of each pair he wishes to monitor. Readout selector 13 establishes which LOP is to be displayed and Indicator 14 visually provides the lane count. This is achieved, in effect, by comparing the phase relationship of the signals being monitored as selected by dials 11 and 12. A chart 15 is also continuously made of the LOP's being monitored. Test controls, synchronizing adjustments, and other less frequently employed controls are furnished behind the panel door 16.

Throughout the remainder of the specification and in the drawings discussed hereinafter, the various elements and interconnecting leads are designated by a two-part numerical indicator. The first part of this indicator is a digit, or digits, corresponding to the FIGURE in which the lead or element first appears, and the second part of the indicator discretely represents a particular element within that FIGURE. Thus, for example, element 5–10 appears in FIG. 5 and is the Crystal Oscillator disposed in the upper left hand quadrant thereof.

Figure 4:
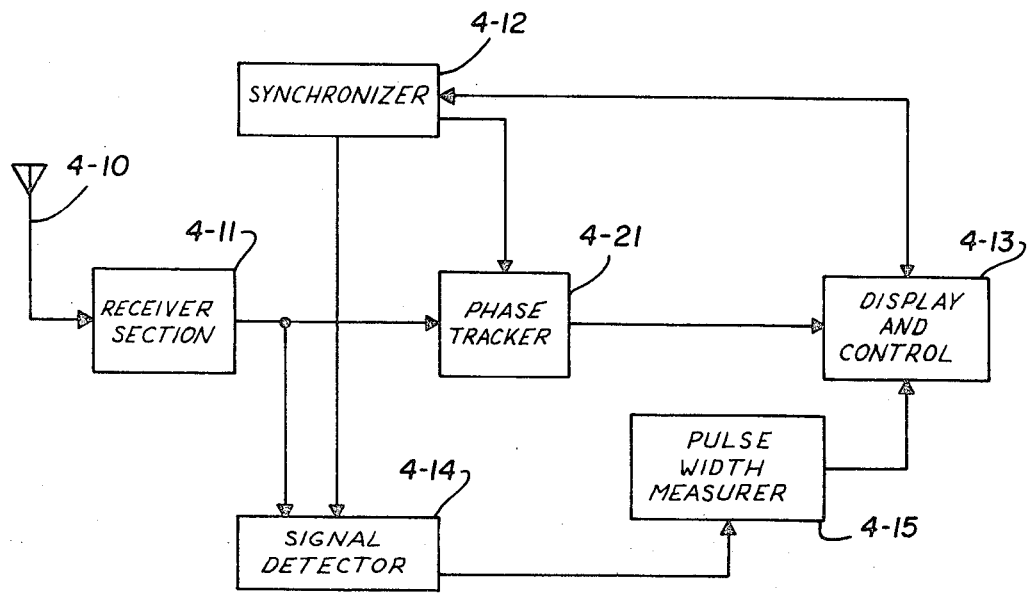
FIG. 4 is a general block diagram of a receiver embodying the features of the present invention.

FIG. 4 is a general block diagram showing the major components of a receiver embodying the features of the present invention. For purposes of clarity, this FIGURE illustrates those elements used in handling a 10.2 kilohertz signal only. The 13.6 kilohertz signal is handled in an analogous fashion and the minor differences are noted subsequently.

Signals received by antenna 4–10 are first presented to the receiving section 4–11 wherein they are recognized and processed for application to the subsequent circuitry of the receiver. Obviously, all signals are received simultaneously in their transmitted sequence and the only cause of ambiguity relative to the received signals resides in the fact that there will always be two transmitters functioning for the same duration of time, although not simultaneously. In general, this does not cause difficulties since the transmitters with the same "on" time are purposely located at great distances from one another on the earth. As a result, the closest transmitter, and hence the one with he strongest signal, will predominate.

As illustrated in FIG. 4, a single Phase Tracker 4–21 is used in the Receiver. This is made possible by multiplexing the phase tracking operation which is, or can be, performed on each of the eight signals received. It will be understood that many of the advantageous features of the invention may be utilized in modifications of the Receiver, and in particular, eight separate phase tracking systems may be used. However, the digital techniques employed in conjunction with the invention render it convenient and highly desirable to utilize multiplexing.

The processing of the received signals is subjected to timing controls established by a Synchronizer 4–12 which contains the master clock of the Receiver. Synchronizer 4–12 generates the internal reference signals from which all timing and control operations are developed. Means are provided under the control of the Synchronizer and Display and Control Section 4–13 for synchronizing the internal clock with the transmitted signals. Thereafter, the Receiver will remain substantially synchronized in phase over long periods of time, mainly as a result of the stability of the internal clock. On the other hand, means are further provided for reasserting synchronization in the event it should be lost. Among other things, Synchronizer 4–12 provides "on-time" gating signals having durations corresponding to the duration of the received signals. These gating signals are applied to Display and Control section 4–13 where they are compared with the received signals and facilitate control over the internal clock to effect actual synchronization.

The Signal Detector 4–14 functions to determined the presence of absence of a signal in Phase Tracker 4–21. If a signal is present, it is used for a number of distinct purposes. First, it is employed as an input to a Pulse Width Measurer 4–15 in order to permit synchronization of the internal clock. Second, it is used in conjunction with "early-late" gates generated by Synchronizer 4–12, which straddle the detected signal and permit fine synchronization of the internal clock.

The individual elements making up Synchronizer 4–12, Receiving section 4–11, Signal Detector 4–14, Pulse Width Measurer 4–15, Display and Control Circuits 4–13, and Phase Tracker 4–21, are set forth in more detail in FIGS. 5 through 8. For a complete illustration of the Receiver, these FIGURES may be assembled as shown in FIGURE 8A.

Figure 5:
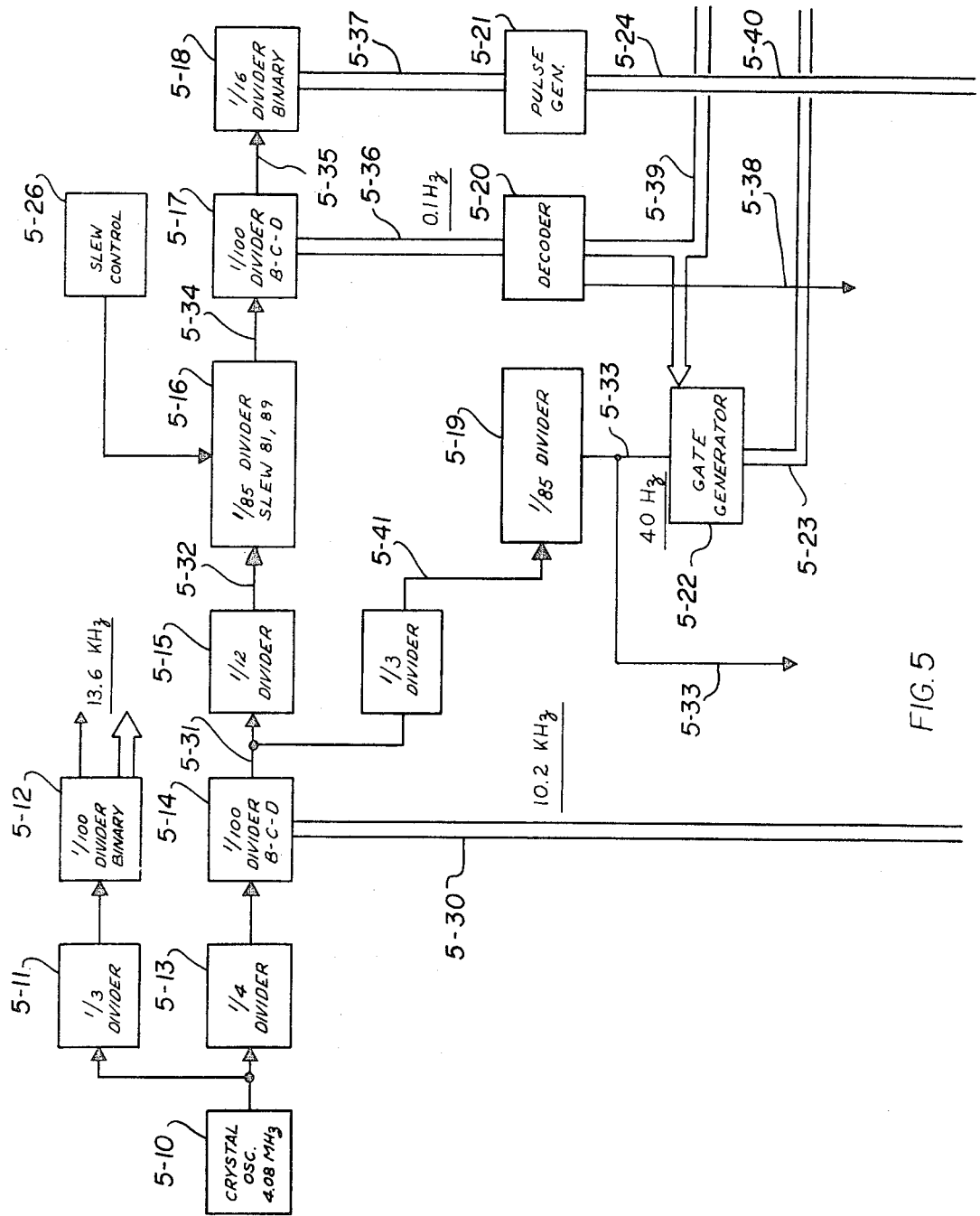
FIG. 5 is a detailed block diagram of the Synchronizer section of a receiver utilizing the features of the present invention.

The synchronizing portion of the receiver, as illustrated in FIGURE 5, contains the master oscillator, digital dividing circuitry, and gating circuitry for establishing the necessary timing sequence and signals for controlling Receiver operation. The master oscillator is a crystal oscillator 5–10 which has been chosen to operate at 4.08 megahertz. Such oscillators can be designed with a stability of approximately one part in one hundred million. Of course, it will be understood that the basic frequency of 4.08 megahertz was chosen because 10.2 kilohertz and 13.6 kilohertz transmission signals are anticipated in the Omega Navigation System. These basic transmission signal frequencies are utilized throughout the description that follows. In the event other frequencies are employed in conjunction with either the Omega Navigation System or other systems of similar type, one need merely adjust the specific frequencies employed in accordance with the skill of the art and the teachings herein.

In order to obtain the basic internal signal frequency of 10.2 kilohertz, the Crystal Oscillator output is divided by 400 in Dividers 5–13 and 5–14. 1/100 Divider 5–14 is a Binary-Coded-Decimal unit and provides output at 5–30 and 5–31. It will be noted that the broad channel illustrated for output 5–30 indicates a cable carrying Binary-Coded-Decimal data that is employed in the automatic range tracking loop illustrated in FIGS. 7 and 8. A signal recurring at the frequency of 10.2 kilohertz is applied via leads 5–31 to subsequent division circuits in order to provide still further control pulses and signals.

The output of Crystal Oscillator 5–10 is also divided by three hundred in Dividers 5–11 and 5–12, to provide a frequency of 13.6 kilohertz. This frequency is available in both Binary-Coded-Decimal form and as a 13.6 kilohertz signal, and is employed as required.

Considering further the 10.2 kilohertz output on lead 5–31, it will be noted that this is first divided by three in order to produce a 3.4 kilohertz signal on lead 5–41, and by twelve in order to produce an 850 hertz signal on lead 5–32. The signal on lead 5–41 is further divided by 85 in Divider 5–19 in order to provide a 40 hertz signal on lead 5–33 which is utilized in a Gate Generator 5–22 to produce the Early and Late Gates shown in FIG. 10. the output of Divider 5–15 is also applied to a Variable Divider 5–16 which effects a nominal division of 85 in order to produce a 10 hertz output on lead 5–34. Divider 5–16 is responsive to a Slew Control 5–26, in known fashion, to modify the division rate during synchronization of the Receiver with the discrete received signals. This capability is sufficient to achieve the required functioning in conjunction with the Display and Control section shown in FIG. 6. A convenient set of division factors might include, 1/81 and 1/89.

The output of Divider 5–16 on lead 5–34 is further divided by one hundred in Divider 5–17 in order to produce a 0.1 hertz signal (i.e., one having a 10-second period) on lead 5–35 and to provide a Binary-Coded-Decimal output at 5–36. The signal on lead 5–35 is further divided by 16 in Divider 5–18 to obtain signals at 5–37 occurring at as slow a rate as 0.006 hertz. The 0.1 hertz Binary-Coded-Decimal signals at 5–36 are applied to a Decoder 5–20 for subsequent processing and distribution via cables 5–38 and 5–39 to the Phase Tracking Section and the Display and Control Sections, respectively. The slowly repeating signals at 5–37 are employed via a Pulse Generator 5–21 as binary rate multiplier pulses operative on the gates appearing in the Phase Tracker of FIG. 8.

It should be noted that the 0.1 hertz signal is a basic synchronization signal for Decoder 5–20 which generates various gates used throughout the receiver. The Decoder input rate of 0.1 hertz establishes the ten second period which corresponds to the repetition period of the Omega Navigation System. Since no synchronization is transmitted by the system, the internally generated ten second period and all of the gates generated therefrom, must initially be brought into time coincidence with the transmitted 10-second period. This is accomplished by varying the nominal division factor 85 that is used for the basic triggering of the Decoder pulse train. By increasing the division factor from 85 to 89, for example, the Decoder 4–20 will operate at a lower repetition rate, and hence the gates developed thereby will tend to be retarded relative to the received signals. This phasing adjustment is continued until phase synchronization is achieved, at which time the divisor is returned to 85, its normal condition.

Four pulse outputs are selected from 1/16 Divider 5–18, and made available on cable 5–37: one pulse every 20 seconds; one pulse every 40 seconds; one pulse every 80 seconds; and one pulse every 100 and 60 seconds. Those skilled in the art are familiar with the manner in which pulses recurring at these intervals may be extracted from a Binary divider comprising four binary stages.

Signal Acquisition

Figure 6:
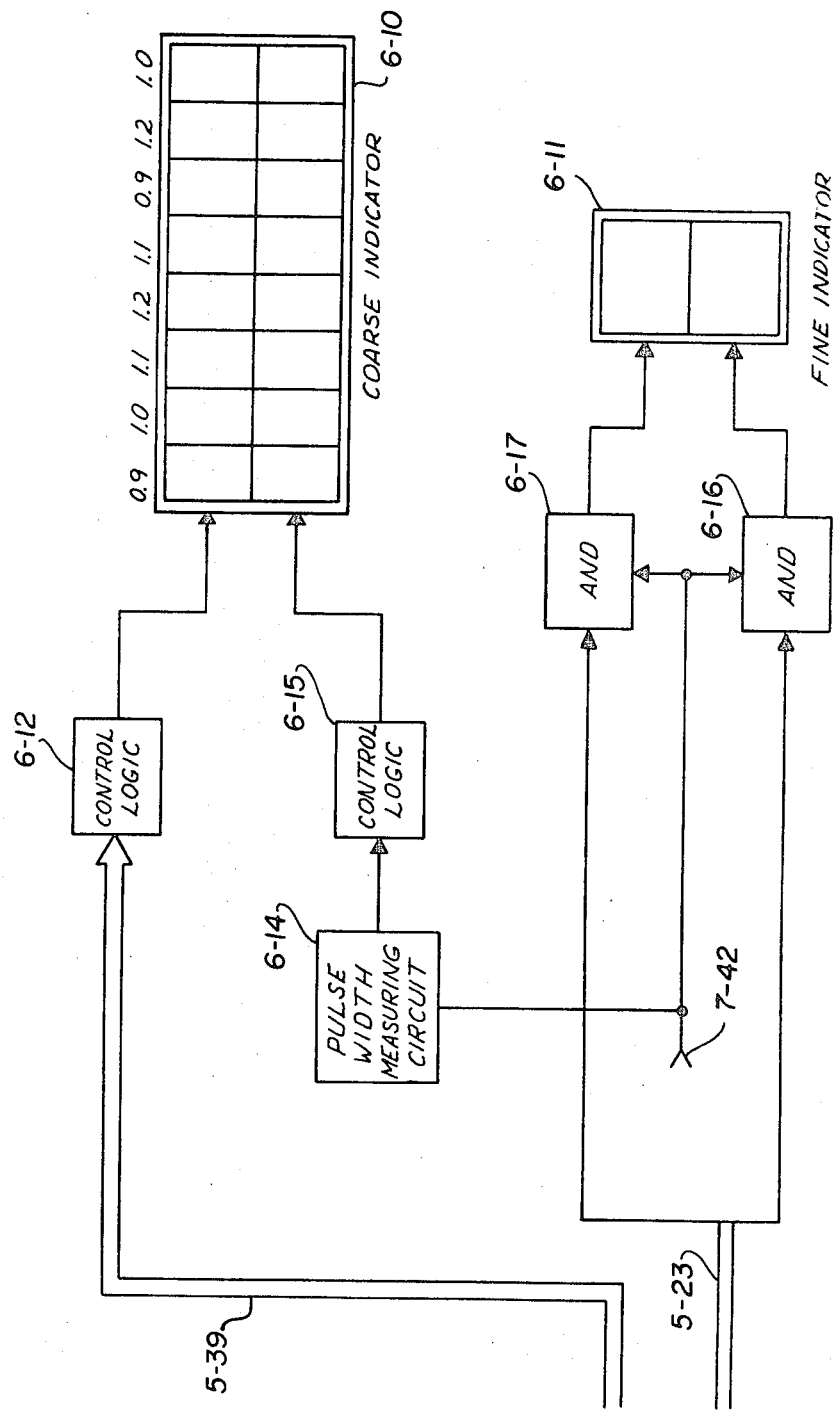
FIG. 6 is a detailed block diagram of the Display and Control section of a receiver utilizing the features of the present invention.

Attention is now directed to FIG. 6, which illustrates the Display and Control Section of the receiver. This FIGURE depicts two indicators 6–10 and 6–11 which are designated "-Coarse Indicator" and "Fine Indicator," respectively. The Coarse Indicator comprises 16 lights arranged in two rows. Thus, there are eight columns of two lights apiece. The columns are designated from left to right, 0.9, 1.0, 1.1, 1.2, 1.1, 0.9, 1.2, and 1.0. Means are provided for the selected illumination of each light in response to a control pulse. These lights correspond to the array of lights 10 appearing on the front panel of the Receiver shown in FIG. 1.

It will be recalled that the transmitting stations of the Omega Navigation System transmit for periods corresponding to the column designations on the Coarse Indicator. Thus, in FIG. 3, the timing diagram shows the Stations A through D transmitting in sequence for periods of 0.9, 1.0, 1.1, and 1.2 second respectively. The remaining four stations of a proposed eight station system would continue transmitting in sequence for the remainder of the 10-second period with periods of 1.1, 0.9, 1.2, and 1.0 seconds, respectively.

Figure 9:
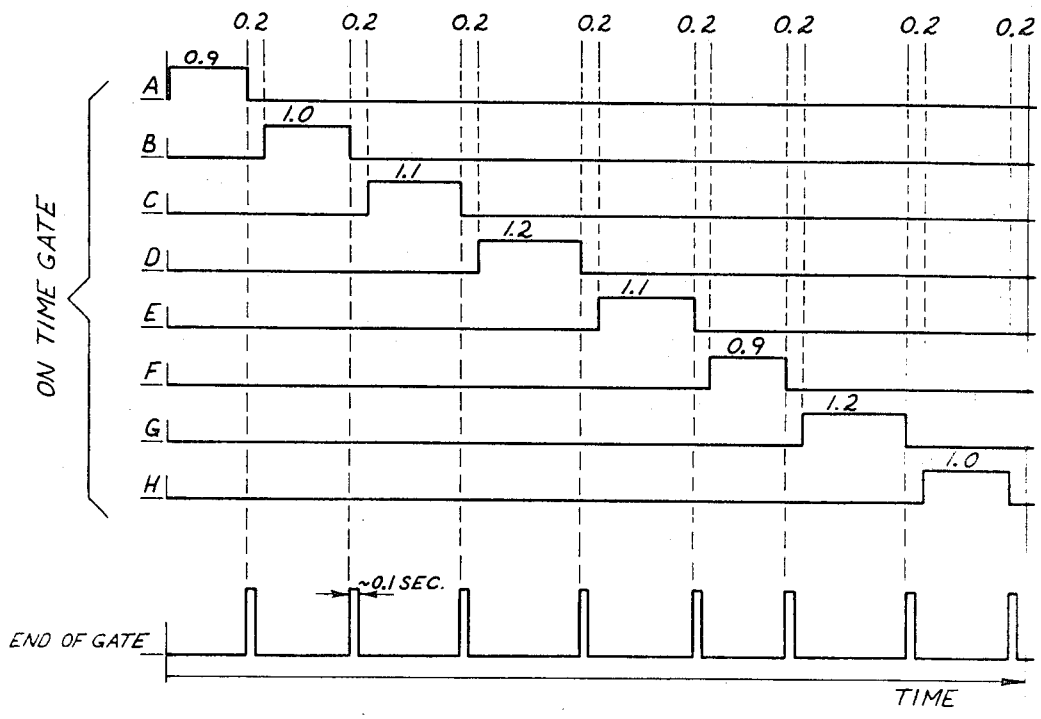
FIG. 9 is a timing diagram illustrating the "on-time" gates produced by the Synchronizing section illustrated in FIG. 5 and used in conjunction with the Display and Control section.

Decoder 5–20 in the Synchronizer section generates a series of "On-Time" gates, corresponding to the received signals. These gates are depicted in FIG. 9 as a function of time. As illustrated in FIG. 9, the plurality of gates A through H correspond to idealized signals which might be received from each transmitting station of the navigation system. These signals are designated in accordance with the transmitter that would be generating a coincident signal at that time. It will be noted that the entire group of signals is generated in sequence over the ten second interval. There is a 0.2-second interval between each signal within which an "end-of-gate" pulse of approximately 0.1 second is positioned. The "end-of-gate" pulse begins at the end of each "on-time" gate.

The operation of aligning the receiver with the transmitted signals of the system, consists of aligning the "on-time" gates with the actually received signals from the various transmitters. Since each of the signals are coordinated relative to one another, each signal that is of sufficient strength to be received, will occur in its proper time position within the 10-second interval.

Returning again to consideration of the Coarse Indicator 6–10, it will be noted that the internally generated "on-time" and "end-of-gate" signals provided by Decoder 5–20, are supplied via cable 5–39 and suitable Control Logic 6–12 to the means for illuminating the upper row of lights. Signals corresponding to those received from the transmitters are applied from the Signal Detector on lead 7–42 to the lower row of lights via a Pulse Width Measuring circuit 6–14 and suitable Control Logic 6–15.

If it is assumed initially that no signals are being received, an operator will witness an illumination of the upper row in appropriate timing sequence under the control of the signals from Decoder 5–20. If the sequence is initiated upon the start of generation of the "on-time" gate $\underline{A}$ in FIG. 9, it will consist of illumination of the first light for approximately 0.1 second when the "end-of-gate" pulse is received. Thereafter, approximately 1.1 seconds later, the 1.0 second light will flash for 0.1 second; approximately 1.2 seconds later the 1.1 light will flash; and approximately 1.3 seconds later the 1.2 light will flash. This continues with the remaining 1.1 light, the 0.9 light, the 1.2 light, and finally the 1.0 light flashing upon occurrence of the "end-of-gate" pulses that are generated upon termination of the signals E, F, G, and H, respectively.

When signals are actually received from the transmitters of the Omega Navigation System, and these signals are of sufficient strength to pass through the Signal Detector and activate the circuitry described hereinafter, these signals are effective to illuminate the appropriate lights in the lower row. Let us assume that a signal of 1.0 second duration is received. Reference to FIG. 3 indicates that a signal of this duration is produced by both station B and station H and that it may be occurring as either the second or eighth signal within the ten second interval. This 1.0 signal is processed by the Signal Detector and applied to Pulse Width Measurer 6–14. Pulse Width Measuring circuit 6–14 may take the form of a simple counting circuit which commences operation upon the occurrence of the signal from the Signal Detector on lead 7–42 and upon completion of this signal, produces a pulse on a discrete lead in accordance with whether the input from the Signal Detector was of a duration of 0.9, 1.0, 1.1, or 1.2 seconds. The output of Pulse Measuring Circuit 6–14 is of approximately 0.1 second duration and it is gated by a Control Logic 6–15 to the appropriate two lights (in this case, the second and eighth) in the lower row of Coarse Indicator 6–10. Thus, if the signal is from station B, upon termination thereof the second and eighth lights in the lower row will be illuminated for 0.1 second. The operator can now observe the relative time of flashing of the upper and lower 1.0 second lights.

In order to align the receiver with the received signal, it is merely necessary to activate Slew Control 5–26 to temporarily affect the division factor of Divider 5–16. If the operator desires to increase the rate of flashing of the internal panel lamps, the division rate of Divider 5–16 is reduced, for example, to 81. This will advance the phase of the internal gates and effectively cause them to occur at an earlier time. Use of Slew Control 5–26 will make it possible to bring the flashing of the 1.0 lights into synchronism. When the upper and lower lights flash in synchronism, the associated signals are substantially in phase.

Since there are two transmitters operating for a 1.0-second interval, namely, transmitters B and H, if the signals from both transmitters are strong, there is no way of determining which transmission is being received. For this reason, it is essential that a second signal of different duration be received and processed in order to resolve the ambiguity. In actuality, stations B and H will be widely separated and consequently there is very little real possibility of receiving the B and H signals simultaneously, or with comparable signal strength.

We may assume that stations A, B, and C are all within range of the Receiver. This being the case, the 0.9, 1.0, and 1.1 second panels in the lower row will all flash at the appropriate time. If an improper sequence is noted, Slew Control 5–26 will be used to correct it. Thus, there is no possibility of ambiguous alignment, when a second signal of different duration is received.

Experience with the operation of this circuitry and recognition of the principles employed, indicates that coarse alignment will in many instances be sufficient for an accurate synchronization of the receiver. Nevertheless, Fine Indicator 6–11 is provided to align the internal timing circuitry with the received signal within an accuracy of approximately 0.075 seconds. In conjunction with the Fine Indicator, Gate Generator 5–22 generates "early" and "late" gates in the intervals between the "on-time" gates.

Figure 10:
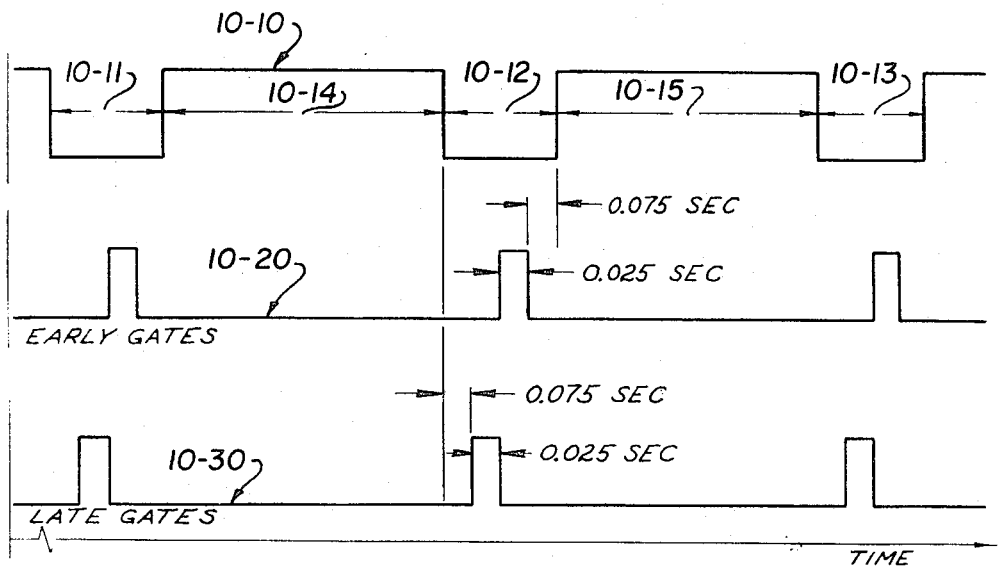
FIG. 10 is a timing diagram illustrating the phase of "early" and "late" gates generated by the Synchronizing section shown in FIG. 5 and utilized in the Display and Control section.

In FIG. 10, waveform 10–10 represents a composite signal developed by adding all of the "on-time" gates. The intervals 10–11, 10–12, and 10–13 between pulses, are of 0.2 second duration. Pulse durations 10–14 and 10–15 correspond to signals representing stations A and B respectively. It will be seen an "early" gate is generated 0.075 second before the beginning of each of the internal "on-time" gates. A "late" gate is generated 0.075 second after the end of each "on-time" gate. The duration of the "early" and "late" gates is 0.025 second. Thus, within the 0.2 second interval between each of the generated "on-time" gates a "late" gate and an "early" gate is produced. These gates are utilized by AND-gates 6–16 and 6–17, respectively, to pass the signals from the Signal Detector on lead 7–42 to either the upper or lower light of Fine Indicator 6–11. When both of these lights are simultaneously extinguished, one is assured that the alignment is better than 0.075 second. If the actual received signal falls within the "late" gate, it will obviously not fall within the "early" gate. By noting that neither the "late" nor the "early" gate is in time coincidence with the signal, the operator is sure that the signal starts no later than 0.075 second before the indicated internal gate time and ends no later than 0.075 second after termination of the internally generated gate.

Although the described synchronization and alignment has no specific effect upon measurement of the phase of the 10.2 kilohertz signals from any two Omega transmitters, it will be appreciated that it permits maximum time to be spent on phase measurements and assures better and more positive station identification.

As a result of the stability of the crystal controlled clock utilized in the Receiver, it is found that only minor adjustments need be made from time time based upon the Fine Indicator operation. With only slight experience, it is possible to establish synchronization of the internal and external gates to within 0.025 second.

Once the internal timing system has been aligned with the external Omega Navigation Transmission system, the Receiver is ready to begin phase measurements upon the various signals received in order to establish the actual location of the receiver itself. These measurements are made within the Receiver and the Phase Tracking sections of the Receiver.

The Receiving Section

The Receiving Section of this Omega receiver system is the only portion operative in analog fashion. This section functions to provide the necessary gain, bandwidth, and processing for signals that may be somewhat below the noise level.

Figure 7:
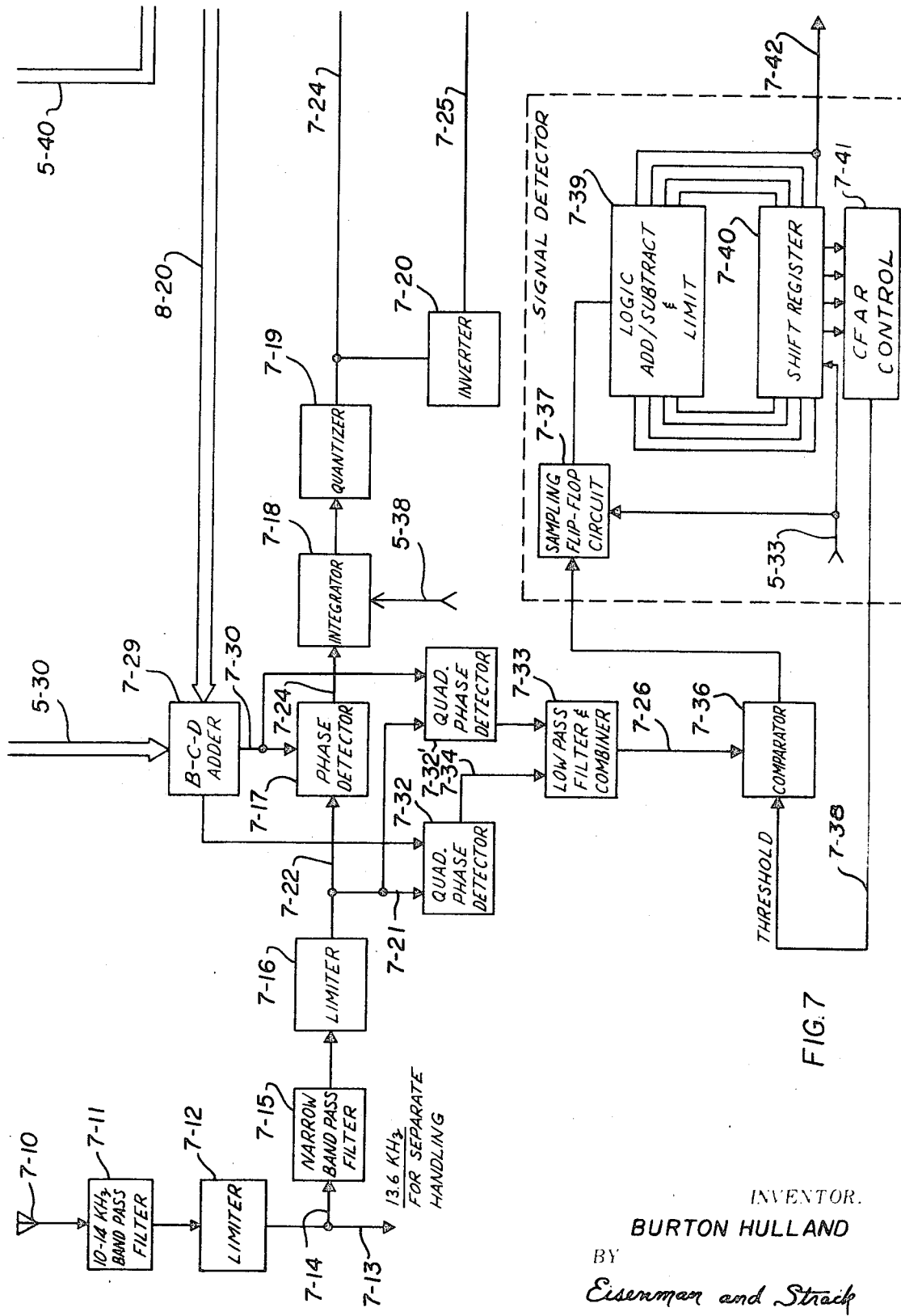
FIG. 7 is a detailed block diagram of the Receiving and Signal Detection section of a receiver utilizing the features of the present invention.

As illustrated in FIG. 7, signals are received by antenna 7–10 and passed through a 10 kilohertz to 14 kilohertz Band Pass Filter 7–11. After treatment by a Limiter 7–12, the signal follows two separate paths on leads 7-13 and 7-14. These paths separate the two signals having basic frequencies of 10.2 kilohertz and 13.6 kilohertz. Only the 10.2 kilohertz channel will be considered at this time. It will be understood that similar circuitry is provided, with necessary changes as required, for treatment of the 13.6 kilohertz signal.

The 13.6 kilohertz signal is used only for phase tracking and consequently would not be subjected to the signal detecting portion of the equipment.

The signal on lead 7-14 is first passed through a very narrow Band Pass Filter 7-15. After filtering, the signal is again limited by a Limiter 7-16 and emerges as a substantially pure signal occurring at the carrier frequency of 10.2 kilohertz. It is necessary to determine the phase of this signal in order to locate the receiving position. Accordingly, the signal from Limiter 7-16 is applied to the automatic Phase Tracking circuitry illustrated in FIG. 8. In addition, this signal is applied via lead 7-21 to the Signal Detection circuitry wherein it is used to develop a well-shaped output for use in the alignment and operations previously described.

Signal Detection

The 10.2 kilohertz signal appearing on lead 7-21 is applied to two sides 7-32 and 7-32' of a Quadrature Phase Detector. In conjunction with a Low Pass Filter and Combiner 7-33, the Quadrature Phase Detector produces the envelope of the received signal on line 7-26. The envelope is compared in Comparator 7-36 with an automatically controlled threshold value to produce a binary signal indicative of the presence or absence of a received signal.

The Receiver provides for the processing of the received signals in order to utilize them in the digital circuitry. Thus, the Signal Detector time quantizes the received signal and furnishes an output at lead 7-42 representative of the presence or absence of a signal during each of the four hundred 0.025 second intervals that may be considered to make up the ten second period of the Omega transmission pattern.

The 10-second time period is divided into 400 units or time bins by quantizing the time base into 0.025 second intervals (the period of a 40 hertz signal). Shift Register 7-40 operates in combination with Logic Circuitry 7-39, Sampling Circuit 7-37, and Comparator 7-36, to store and produce the desired discrete signal information relative to each time bin. This Shift Register may in fact comprise four hundred appropriately interconnected binary stages, each of which comprises in turn a four-stage binary counter or register capable of registering a maximum count of 15 and a minimum count of zero.

A 40 hertz signal is provided by the Synchronizing Circuit over lead 5-33. This signal is operative to trigger Sampling Circuit 7-37 once every 0.025 second. Sampling Circuit 7-37 may take the form of a steered flip-flop which produces a binary output in accordance with the presence or absence of a signal from Comparator 7-36 at the time of triggering. The output of Sampling Circuit 7-37 is used via Logic Circuitry 7-39 to either add or subtract a digit to the number stored in the stage of the Shift Register corresponding to the time bin being sampled. Following this updating of the stage, the succeeding stage is rendered available for updating.

A Constant False Alarm Rate (CFAR) control 7-41 is provided to control the threshold voltage on lead 7-38 at a level such that the Comparator 7-36 output, when no signals are being received, is a fixed "false alarm" rate due to noise. The binary number in Shift Register 7-40 is sampled at four equally spaced time taps within the 10 second period (representing a time separation of 2.5 seconds). The lowest number existing at these four taps has a very high probability of being a sample from a region in the ten second Omega time frame in which no signal is being received. Since a Receiver will not receive signals from all eight transmitters, the time positions occupied by transmissions too remote for reception will simply contain noise. This number is compared to a level corresponding to the desired average number that noise should be integrated to in the Shift Register. When the least sample is greater than this level, the CFAR loop acts to increase the threshold voltage via lead 7-38 slightly, thus reducing the false alarm rate at the Comparator 7-36 output. The opposite effect is achieved when the least sample is less than the reference level. Thus, a closed loop system is seen to be implemented which establishes the threshold voltage at a desired level.

Consider the sequence of operation encountered during reception of a 1.0 second signal which recurs every ten seconds. An ideal signal of this type will be present for forty 0.025 second time bins. In actuality, atmospheric and other attenuations may cause a received signal to appear much less frequently. Comparator 7-36 will produce an output during the 1.0 second signal presence and Sampling Circuit 7-37 will accordingly produce a discrete binary output, e.g., a binary one, each time the 40 hertz trigger signal appears on lead 5-33. Shift Register 7-40 is stepped at the 40 hertz rate and will therefore present a separate stage to the Control Logic 7-39 during each time bin. When the binary one signal is present at the output of Sampling Circuit 7-37, the count registered in the stage of the Shift Register that corresponds to that particular 0.025-second time bin will be increased by one via Logic Circuit 7-39. Conversely, during those time bins when no signal is present, Comparator 7-36 will produce no output, resulting in a binary zero from Sampling Circuit 7-37. This causes a decrease in count of one in the correspondin stage of Shift Register 7-40 via Logic Circuit 7-39. Assuming continuous reception, after elapse of 2 minutes (i.e., twelve 10-second intervals) 40 successive stages of Shift Register 7-40 will register a count of 12 and all other stages will register a count near zero.

For purposes of the present Receiver, it is assumed that when the Detector registers a count of eight in any time bin, a signal is present. Thus, a pulse is produced on output lead 7-42 when the stage corresponding to any time bin contains a count of eight or greater. In the case under consideration, after reception of an ideal 1.0 second duration signal for 1 minute and 20 seconds, lead 7-42 will provide trains of 40 pulses at a 40 hertz repetition rate and recurring at 10-second intervals. Under actual operating conditions, the pulse trains appearing on lead 7-42 will represent a synthesis of all received signals. The eight Shift Register stages corresponding to the 0.2 second intervals between received signals will be well below eight and thus there will be a clear delineation between the signals from each transmitter.

The Pulse Width Measuring Circuit 6-14 functions to count the pulses produced on line 7-42. Thus, it registers a value equal to the number of time bins wherein the corresponding Shift Register stage registers eight or more. The four possible Omega signals occurring at 0.9, 1.0, 1.1, and 1.2 seconds will generate ideal counts of 36, 40, 44, and 48, respectively. However, due to possible pulse stretching, the Receiver is set to identify any count from 35 through 38 as indicative of a 0.9 second signal; any count from 39 through 42 as indicative of a 1.0 second signal, any count from 43 through 46 as a 1.1 second signal; and any count from 47 through 50 as a 1.2 second signal. Control Logic 6-15 effects recognition of the various count limits and initiates illumination of the appropriate light in the lower row of Coarse Indicator 6-10.

Phase Tracker

Since there are eight potential transmitters in the Omega Navigation System, it is desired that the Receiver be capable of simultaneous reception of the 10.2 kilohertz and 13.6 kilohertz signals from all eight stations. This reception capability requires that means be provided for tracking in phase, 16 signals simultaneously. This may be accomplished either with 16 separate phase tracking circuits or by a multiplexing arrangement wherein a single phase tracking circuit is used for all signals in each of the two received frequencies. In actual practice, only the 10.2 kilohertz signal is required for primary position fixing. Thus, for convenience in explanation, the following description will first be made relative to a single phase tracking operation at 10.2 kilohertz. Thereafter, the additional elements required for the unique multiplexing of all 10.2 kilohertz signals will be described.

Figure 8:
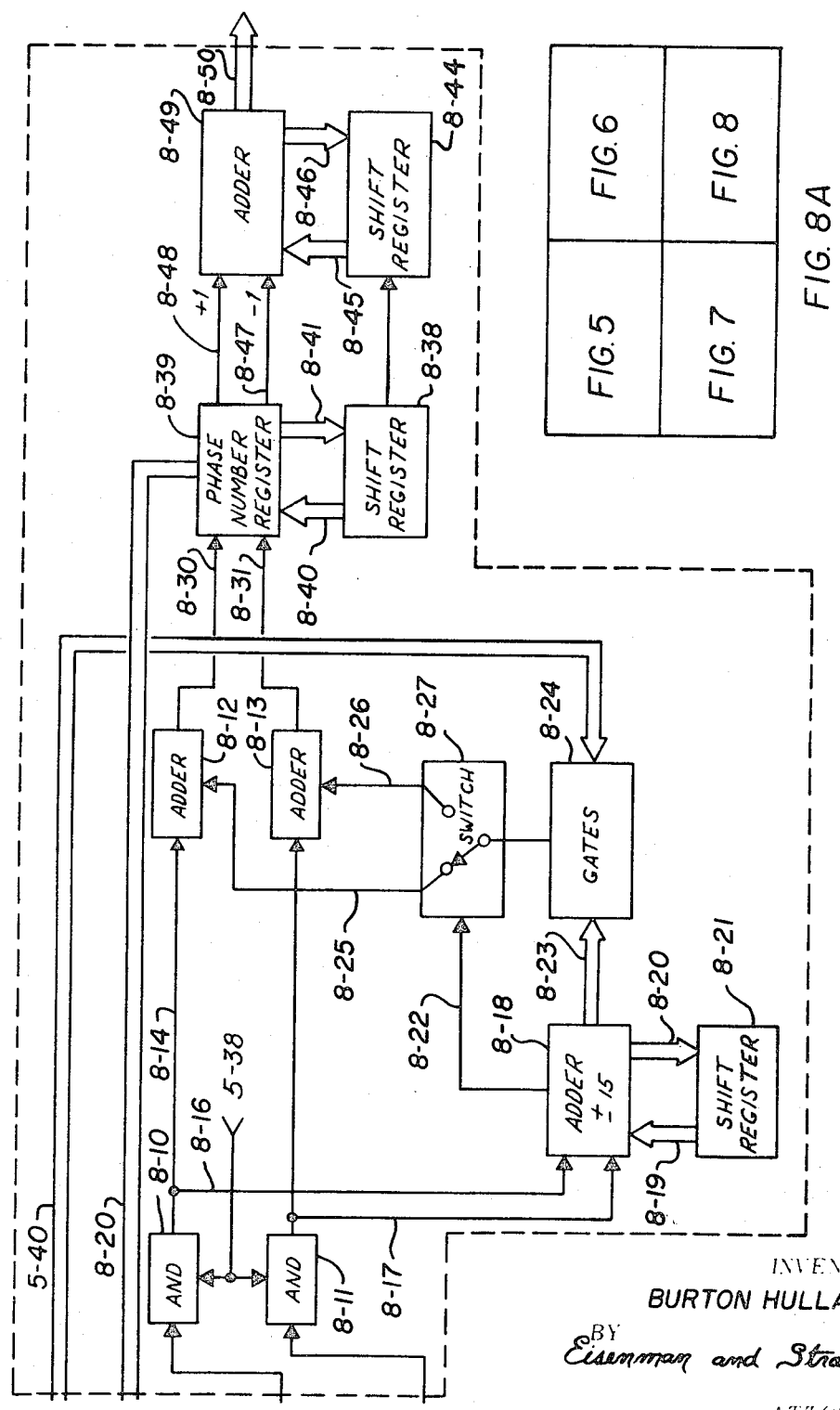
FIG. 8 is a detailed block diagram of the Phase Tracking section of a receiver utilizing the features of the present invention.

Considering FIGS. 7 and 8 jointly, it will be seen that there is an upper loop portion which operates as a single integrator tracker and a lower loop portion which compensates for tracking errors which may be introduced as a result of motion of the receiving stations. This lower loop is analogous to the second order stabilizing loop found in analog servo technology. It should be noted that the entire Phase Tracking operation is carried out using digital elements and techniques which make multiplexing both possible and convenient to implement.

Attention is first directed to the binary-coded-decimal Adder 7-29 appearing in the upper center portion of FIG. 7. This Adder may be a two decade unit, each decade comprising four stages re-entrantly connected to yield a decimal count of 10. It is adapted to add from 0 to 99 continuously in response to a number on leads 5-30 from Divider 5-14. This number cycles from a 0 to 99 at a 1.02 megahertz rate such that a complete adding cycle occurs at the rate of 10.2 kilohertz. The actual number registered in Adder 7-29 at any time, can be modified by an input over cable 8-20 which imposes a "Predicted Phase Number" upon the Adder in order to assure phase synchronization at the 10.2 kilohertz frequency between the internal clock and the received signal. The Predicted Phase Number, which is the feedback of the closed loop Phase Tracking circuit, is fed into Adder 7-29 from Phase Number Register 8-39 and changes during the interpulse period. Inasmuch as the Adder is modified at a rate of 1.02 Megahertz, it changes at a rate of approximately one number per microsecond. Since there are 100 counts required, the complete cycle occupies the time exactly equal to the period of the 10.2 kilohertz signal, or approximately 100 microseconds.

FIG. 11A is a chart or graph, having an abscissa representing time and an ordinate representative of phase number, which will be helpful in considering the operation of Adder 7-29 relative to the remainder of the circuitry. On this chart, the output trigger pulses on lead 5-30 will be seen to normally act upon Adder 7-29 in order to produce the solid line 11-11 which increases with fixed slope as time progresses. If one introduces a predicted phase number at some point in the operating cycle, e.g., 15, the output will proceed along the dashed line 11-12. In this instance, the Adder is starting with a bias of +15 at the beginning of a 10.2 kilohertz period. In effect, Adder 7-29 functions as an adjustable phase shifter.

An output is extracted from Adder 7-29 on lead 7-30 when the count reaches 50. This output terminates when the count reaches 99. Suitable logic circuitry is provided in order to extract this output and to deliver it with a binary value of one. A waveform corresponding to this condition is illustrated in FIG. 11B which has been plotted on the same time scale as FIG. 11A and represents the waveform when the predicted phase equals zero.

The waveform appearing in FIG. 11C is that which is provided at the output of Adder 7-29 when the predicted phase equals 15 and the count proceeds in accordance with the dashed line 11-12 shown in FIG. 11A. It will be immediately apparent that the FIG. 11C waveform is advanced in phase relative to the FIG. 11B waveform by the value of 15. In view of the frequencies employed, this corresponds to approximately 15 microseconds or, more precisely, 15/100 of the 10.2 kilohertz period. Thus, a phase shifter is provided wherein by varying the Predicted Phase Number, a gate is produced which can be moved in 1-microsecond increments to any desired position in time.

The gate that has just been described is applied to Phase Detector 7-17 as one input. A second input is received over lead 7-22 and corresponds to the 10.2 kilohertz input signal.

One function of Phase Detector 7-17 is to provide an output which will enable accurate alignment of the incoming signal relative to the internal clock pulses. Attention is directed to the three waveform diagrams appearing in FIGS. 12A and 12B and labeled $\underline{A}$, $\underline{B}$, and $\underline{C}$. Each of these FIGURES is arranged with an abscissa representing time and an ordinate representing amplitude. The time scales in each of the waveforms on the left and right are aligned so that a vertical line would represent the same instant of time on each waveform.

When the Receiver is properly tracking the received signals, the gate $\underline{B}$ will be positioned relative to the incoming waveform $\underline{A}$ as shown in FIG. 12A. Under this condition, the gate on lead 7-30 is positioned in the center of the incoming waveform on lead 7-22 and the signal passed by Phase Detector 7-17 has equal positive and negative portions. Improper alignment is illustrated in the waveform of FIG. 12B which illustrates that the gate $\underline{B}$ occurred at an advanced position in phase and Phase Detector 7-17 accordingly passes a greater positive portion of the incoming wave $\underline{A}$ than the negative portion. The Phase Detector output occurs at a 10.2 kilohertz rate and will have a net value that is either positive or negative, depending upon whether the gate is advanced or retarded relative to the received signal.

It will be apparent that when the gate is properly aligned to provide a zero output (equal positive and negative portions of waveform $\underline{C}$) to the succeeding Integrator 7-18, the Predicted Phase Number that had been set into Adder 7-29 in order to achieve this condition is discretely representative of the phase of the incoming signal relative to the internal clock. The specific value of the predicted phase number has no true significance; however, similar phase numbers developed for each received signal may be compared to determine the difference therebetween. Circuitry (not shown) is provided to effect the subtraction of the phase numbers representative of selected station Paris and the difference is usually displayed at Indicator 14 in FIG. 1. This difference is a true value and is effective in determining the geographical position of the Receiver. It will be noted that the actual phase detection and comparison is carried out on a digital basis and any errors that may be introduced by the preceding analog portion of the receiving section will be added to each of the received signals, subtracted out in the comparison process and, therefore, have no significance in the phase comparison operation.

Cyclically Operated Integration Circuitry

Figure 13:
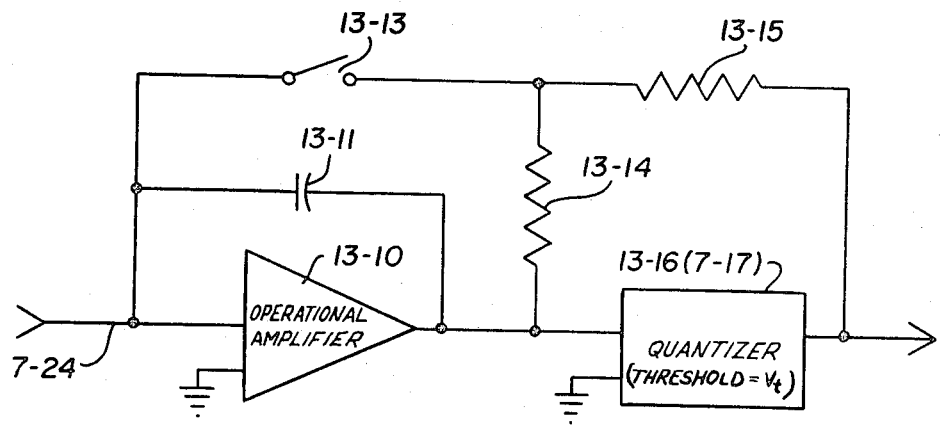
FIG. 13 is a block circuit schematic of the Integrator and Quantizer circuit employed in the Receiving and Signal Detection section.

The output of the Phase Detector is of the nature illustrated by waveforms $\underline{C}$ in FIGS. 12A and 12B. It is necessary to evaluate this output in order to determine whether or not the net value is plus or minus. This is done by means of an Integration circuit 7-18 coupled to a Threshold Quantizer 7-19. A more detailed circuit schematic of these components is illustrated in FIG. 13. In general, the Phase Detector output is integrated by Integrator 7-18 for the entire time during which the signal is being received, e.g., for station A, this would be 0.9 second. At the end of this period, the Integrator is reset to zero so that it is ready to repeat integration upon the next received signal. The Integrator output is fed to a Quantizer 7-19 that produces either a positive or negative output depending upon the sign of the phase error existing in the tracking loop. This is a discrete one or zero signal.

With reference to FIG. 13, it will be recognized that each time the Integrator is to be reset to zero, a signal must be received to initiate this condition. In a particular embodiment, this signal is provided by the Decoder 5-20 and occurs at the end of each known signal interval. Since the internal clock has been aligned by means of the Coarse and Fine Indicators with the incoming signal, it is possible to provide such a "dump pulse" at the appropriate time. With respect to the single illustrative circuit of FIG. 13, this dump pulse is considered to have the effect of closing a switch 13-13. It will be appreciated that this mechanical representation of a switch has been selected simply in order to facilitate the explanation of circuit operation. In fact, suitable electronic switching means will be provided in the receiving system.

The Operational Amplifier 13-10 functions in a normal way to integrate signals supplied over lead 7-24. It remains in this integrating mode as long as the switch 13-13 is open. During integration, capacitor 13-11 achieves a voltage on its right-hand plate corresponding to the net output of the Phase Detector. The Quantizer 13-16 which is connected to the output of the Operational Amplifier, senses a zero phase error as its threshold voltage. In fact, the zero phase error condition may not be the same as zero volts. The Integrator 13–16 output must be restored to the Quantizer threshold voltage during the interpulse period of 0.2 second. This is achieved via the feedback arrangement illustrated in FIG. 13. Upon receipt of end-of-pulse signal from decoder 5–20, switch 13–13 is closed and places resistor 13–14 in parallel with capacitor 13–11 to provide a discharge path therefor. This immediately brings the integrator voltage close to the desired threshold voltage of $V_t$. In addition, further feedback is provided around the Quantizer by means of resistor 13–15. In the event the discharge of capacitor 13–11 through resistor 13–14 leaves the Integrator output voltage above $V_t$, the Quantizer output will be positive, thereby charging capacitor 13–11 through resistor 13–15 to drive the Integrator output to the desired value. Thus, in steady state, the Integrator output is held at precisely the threshold voltage of $V_t$. When the next signal reception period begins, switch 13–13 is opened and the Integrator has no initial bias relative to the Quantizer threshold.

Let us now return to consideration of FIGS. 7 and 8. The Quantizer 7–19 output is either positive or negative depending upon the sign of the phase error and will appear as either a logic one or a logic zero. In accordance with whether or not the output is a one or zero, AND-gate 8–10 or AND-gate 8–11 will be effective upon receipt of an end-of-pulse gate signal from Decoder 5–20, to pass a pulse via Adder gate 8–12 or 8–13 to the up or down input of the Phase Number Register 8–39.

Phase Number Register 8–39 is a binary-coded-decimal Adder operative to count up or down in accordance with whether or not signals are applied on leads 8–30 or 8–31, respectively. It is contemplated that this Adder will have two decades of four stages each. Thus, the output cable 8–20 from Phase Number Register 8–39 will accomodate leads suitable for direct input to each stage of Adder 7–29.

In recapitulation, it will be noted that a control loop has been completed in such a fashion that the Phase Number Register will preset Adder 7–29 in accordance with whether or not the gate from Adder 7–29 leads or lags the received signal. The time constant of the loop is quite long inasmuch as the pulses from Quantizer 7–19 are gated to the Phase Number Register at the end of each signal period for each particular station. This occurs once every 10 seconds. Thus, the predicted phase number is changed by a single count once every 10 seconds only.

The lower loop of the Phase Tracker, which includes Adder 8–18, Logic gates 8–24, and switch 8–27, is incorporated in order to account for the fact that the Receiver will, in most instances, be in motion relative to the transmitters and will consequently create a velocity error. Adder 8–18 is a binary adder. It distinguishes from the Phase Number Register 8–39 in that it comprises five bits only. Thus, counter 8–18 is supplied with inputs which enable it to count either up or down depending upon whether these inputs are applied on leads 8–16 or 8–17 respectively. Inasmuch as it has a single decade and it has not been arranged as a decimal counter, this binary counter is capable of registering any number from +15 to −15. It will be recalled that AND-gates 8–10 and 8–11 produce a single output upon termination of the signal being quantized from any particular transmitter. Thus, Adder 8–18 is adjusted up or down once every 10 seconds. If the Receiver has a velocity relative to the transmitting station; for example, if the Receiver is moving away from the transmitting station rather than in an arc with a constant radius, the receiving station would normally drift out of phase with the transmitting station at a relatively constant rate. The lower loop compensates for this motion by submitting additional pulses to the Phase Number Register 8–39 with the proper polarity and at the proper rate to reduce the velocity error introduced by this Receiver motion to substantially zero.

Adder 8–18 thus resides at a count some point between −15 and +15 in accordance with the rate of Receiver velocity. The polarity of the number registered is provided via lead 8–22 to a switching circuit 8–27 and determines whether or not the switch is in an "up" or "down" position. It will be understood that switch 8–27 is illustrated in a mechanical form. In fact, it is implemented in an electronic fashion. Adder 8–18 is operative to control gate 8–24 via leads 8–23 in order to pass binary rate multiplier pulses from the Pulse Generator 5–21 into the up and down terminals of Phase Number Register 8–39. As noted previously, Pulse Generator 5–21 has four discrete outputs. These outputs provide a single pulse every 20, 40, 80, or 160 seconds.

Figure 14:
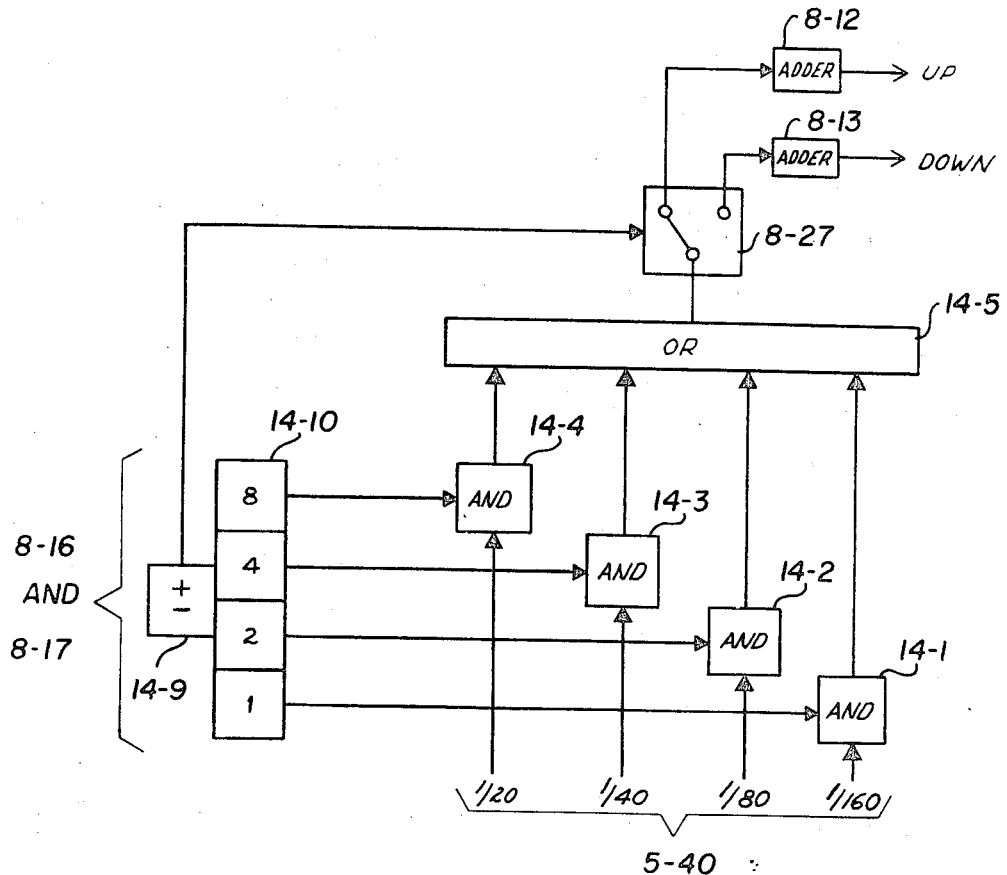
FIG. 14 is a block diagram illustrating the generation of Binary Rate Multiplier pulses for use in the Phase Tracking section.

Reference may be had to FIG. 14 for a more detailed illustration of the configuration of Adder 8–18 and the Logic Gates 8–24. Logic Gates 8–24 may comprise four AND-gates 14–1 through 14–4, each receiving inputs from Pulse Generator 5–21 and also from a counter 14–10 which makes up the Adder 8–18. The output of each AND gate is directed through an OR-gate 14–5 into switching circuit 8–27. Thus, when the counter 14–10 registers a count of two, AND-gate 14–2 is enabled to pass two pulses for every 160 seconds or one pulse every 80 seconds. In accordance with whether or not the number polarity is positive or minus, these pulses are directed through Adders 8–12 or 8–13, respectively, to the up or down count input of Phase Number Register 8–39.

The particular lane in which the Receiver resides relative to a transmitter may be monitored by keeping track of the change of the Predicted Phase Number. A full cycle, or 360°, of the 10.2 kilohertz signal represents a lane width. In order to traverse a full cycle, the phase number will go through a complete count of 100. Adder 8–49 is a three decade binary coded decimal counter which is responsive to phase number changes to either add or subtract a number as the phase number register goes through a complete cycle. Adder 8–49 has a capacity for a lane count of 999 and this may be presented on its output 8–50 for monitoring in any desired fashion.

Multiple Station Tracking (Multiplexing)

In the immediately preceding section, the operation of the Receiver was described in connection with signals received from a single transmitting station. In fact, under optimum conditions, signals are received from each of the transmitting stations. Under other conditions, the Receiver will be responsive to at least several of the transmitting stations. Thus, the phase tracking capability must be provided for each received signal and these signals must be operated upon in the manner already described. The Receiver described herein is particularly well adapted for the handling of the signals on a time-multiplexed basis, in view of the fact that they are sequentially received.

Considering the phase tracking circuitry shown in FIG. 8, it will be recalled that the Adder 8–18 stores a number representing Receiver movement relative to a first transmitting station. This number is changed at most only once every ten seconds when the signal from that transmitter is received and acted upon. During the remainder of this ten second interval, it is possible, and indeed desirable, to utilize the Adder in conjunction with the other transmitted signals. Storage means are provided which cooperate with each of the various registers of the Phase Tracker.

A Shift Register 8–21 is employed in conjunction with Adder 8–18. This Shift Register is designed to receive five-bit words. Each five-bit word corresponds to the complete registration of Adder 8–18 wherein four bits register the count number from zero to 15 and the fifth bit registers the polarity of the count. A signal from the Decoder is employed in conjunction with appropriate gating circuitry for transferring information into and out of the shift registers in synchronism with receipt of the various signals from the transmitters.

Shift Register 8–38 is provided in association with the Phase Number Register 8–39. This Register is an eight-stage unit having eight-bit words in each stage. Thus, a stage is capable of storing the full count in the Phase Number Register at any time. Signals from the Decoder are employed for shifting information into and out of Shift Register 8–38 on leads 8–41 and 8–40, respectively, in synchronism with the particular signals being received.

Still further, a Shift Register 8–44 is provided in association with the three decade Adder 8–49 which is utilized for providing the lane count. This Shift Register comprises eight stages, each capable of storing 12-bit words, as required for operation in conjunction with the Adder 8–49. It will be noted that Shift Register 8–44 is also controlled for input and output shifting from the Decoder and that it is maintained in synchronism with the particular signals being acted upon at any one time.

In recapitulation, there has been described a Receiver utilizing the characteristic features of the present invention. This Receiver employs a number of active circuits in order to be operative within the Omega Navigation System to acquire, align, and produce information making it possible for the Receiver operator to accurately locate his position. The equipment described above is entirely digital with the exception of a limited number of analog input circuits from the receiving antenna. All comparisons of phase are made on a digital basis and can be guaranteed accurate within 3.6°.

A detailed explanation of the treatment of the secondary signals received from each transmitter, i.e., the 13.6 kilohertz signals, has not been made. As pointed out at the beginning of this description, the major receiver functions are performed upon the 10.2 kilohertz signal. Nevertheless, automatic phase tracking is provided on the 13.6 kilohertz frequency. This is done in exactly the same manner as described for the 10.2 kilohertz signal.

It should be appreciated that throughout this discussion several specific arrangements have been described in order to teach those skilled in the art a manner in which the system may be advantageously implemented. There is no intention to restrict the invention to the specific frequencies or elements suggested hereinabove. The invention and its scope should be construed in accordance with the scope of the appended claims. All modifications which come within the skill of those in the art and which embrace the teachings of the present invention as circumscribed by the claims, are intended to be covered thereby.

What is claimed is:

1. A method of signal detection responsive to sequentially transmitted signals of known, but different, duration which are transmitted with a recurring period; comprising sequentially generating a plurality of signals corresponding to each of said transmitted signals, visually displaying said generated signals in a time-related manner, visually displaying said transmitted signals in a corresponding time-related manner and in juxtaposition with the display of the corresponding generated signals, and adjusting the phase of said generated signals to effect coincidence of the displays of said generated and transmitted signals.

2. A method of signal detection as defined in claim 1, wherein said transmitted signals are separated in time by a known interval, including generating pulses synchronized with said generated signals which precede and succeed said generated signals by a predetermined interval, providing a first signal when said preceding pulse is coincident with a transmitted signal and providing a second signal when said succeeding pulse is coincident with a transmitted signal, and visually displaying the occurrence of coincidence.

3. A method of signal detection as defined in claim 1, including receiving said transmitted signals and producing an electric signal corresponding thereto, creating a plurality of time bins within said recurring period, sampling said electric signal a plurality of times within the known duration thereof and producing a binary indication when it is present, storing and counting said binary indications occurring within each time bin, and producing a signal of said known duration when an appropriate plurality of time bins register the occurrence of a predetermined number of binary indications.

4. A signal detection system responsive to sequentially received signals of known, but different, durations, which are received with a recurring period; comprising means for sequentially generating a plurality of signals having said known, but different, durations, first means for creating a visual display corresponding to the occurrence of each of said generated signals; and second means for creating a visual display corresponding to the reception of each of said received signals, in juxtaposition with the display of said generated signals.

5. A signal detection system as defined in claim 4, including means for adjusting the phase of said generated signals to achieve coincidence of said displays.

6. A signal detection system as defined in claim 4, wherein said visual displays comprise indicators individual to each signal which are actuated for a predetermined time interval following termination of each signal.

7. A signal detection system as defined in claim 6, comprising a first plurality of lights individual to each of said generated signals and arranged in a first row in the order said signals are sequentially generated, and a second plurality of lights individual to each of said received signals and arranged in a second row in the order said signals are sequentially received, the lights in one of said rows being arranged in juxtaposition with the lights in the other row individual to signals of corresponding duration.

8. A signal detection system as defined in claim 4, wherein said second means comprises means responsive to said received signals to produce a discrete output during the presence thereof; detection means for sampling said discrete output a plurality of times within the duration of each said received signal and operative to register the number of times said output is present during said duration, and means controlled by said detection means for generating a display control signal having the duration of each said received signal in accordance with the number registered in said detection means.

9. A signal detection system responsive to sequentially transmitted signals of known, but different, durations, which are transmitted with a recurring period; comprising digital means for sequentially generating a plurality of local signals corresponding to each of said transmitted signals and having said known durations, first display means responsive to said local signals to visually display the occurrence of each of said local signals, second display means operative in response to said transmitted signals to visually display the occurrence of each of said transmitted signals in juxtaposition with the display of said local signals, and means for phase aligning said local signals with said transmitted signals.

10. A signal detection system as defined in claim 9, including receiving means responsive to said transmitted signals to produce an electric signal corresponding thereto, means operative to produce a discrete output when said electric signal exceeds a predetermined threshold, sampling means operative to sample said discrete output a plurality of times within the duration of each transmitted signal and provide a binary indication when said electric signal is present, register means operative to store said binary indications in time bins representing discrete time intervals within said recurring time period, said register means recording the number of said binary indications present in each time bin, and means for producing outputs to control said second display means when said number exceeds a predetermined value.

11. A signal detection system as defined in claim 10, wherein said last mentioned means comprises counting means operative to produce a signal of the known duration corresponding to a transmitted signal when the numbers in a plurality of time bins exceed said predetermined value, said signal being operative to control said second display means.

12. A signal detection system as defined in claim 4, wherein said received signals are separated in time by a known interval, including means for generating pulses synchronized with said generated signals and spaced in time to precede and succeed each of said received signals by a predetermined interval, and means for comparing said generated pulses with said received signals to effect phase alignment of said local signals and said received signals.

13. A signal detection system as defined in claim 12, wherein said last-mentioned means comprises logic means for providing a first signal when said preceding pulse and said received signal appear coincidentally and for providing a second signal when said succeeding pulse and said received signal appear coincidentally, and visual display means responsive to said first and second signals.

14. A signal detection system as defined in claim 9, wherein said transmitted signals are separated in time by a known interval, including digital means for generating pulses synchronized with said local signals in time to precede and succeed each of said transmitted signals by a predetermined interval, and logic circuits for comparing said generated pulses with said transmitted signals to effect phase alignment of said local signals and said transmitted signals.

15. A signal detection system as defined in claim 14, wherein said logic circuitry comprises means for providing a first signal when said preceding pulse and said transmitted signal appear coincidentally and for providing a second signal when said succeeding pulse and said transmitted signal appear coincidentally, and visual display means responsive to said first and second signals.

16. A method of signal detection as defined in claim 3, wherein following reception of said transmitted signals, they are compared to a threshold level prior to the production of said electric signal, said threshold level being developed from analysis of the time bins registering a minimum number of binary indications.

17. A signal detection system as defined in claim 8, wherein said discrete output is produced only when said received signals exceed a threshold level, and including means responsive to said detection means operative to establish said threshold level in accordance with the number registered therein during the time periods when no signal is being received.

* * * * *